Oct. 15, 1929. V. G. APPLE Re. 17,455

METHOD OF BUILDING ARMATURES

Original Filed Oct. 11, 1920 2 Sheets-Sheet 1

INVENTOR

Vincent G. Apple

METHOD OF BUILDING ARMATURES

Original Filed Oct. 11, 1920 2 Sheets-Sheet 2

INVENTOR
Vincent G. Apple

Reissued Oct. 15, 1929 Re. 17,455

UNITED STATES PATENT OFFICE

VINCENT G. APPLE, OF DAYTON, OHIO

METHOD OF BUILDING ARMATURES

Original No. 1,555,931, dated October 6, 1925, Serial No. 416,307, filed October 11, 1920. Reissue 17,353, dated July 2, 1929, filed July 12, 1927. Serial No. 205,259. Division A. This application for reissue filed July 12, 1927. Serial No. 205,260.

DIVISION B

The invention relates to methods of building armatures and has especial reference to armatures of the bar wound type and apparatus necessary for carrying out my improved method.

The object of the invention is to provide means to facilitate the insertion of a plurality of conductor bars into the apertures of a dynamo electric machine core.

I attain this object by the apparatus illustrated in the accompanying drawings wherein:—

Similar numerals refer to similar parts thruout the several views.

Figure 1:
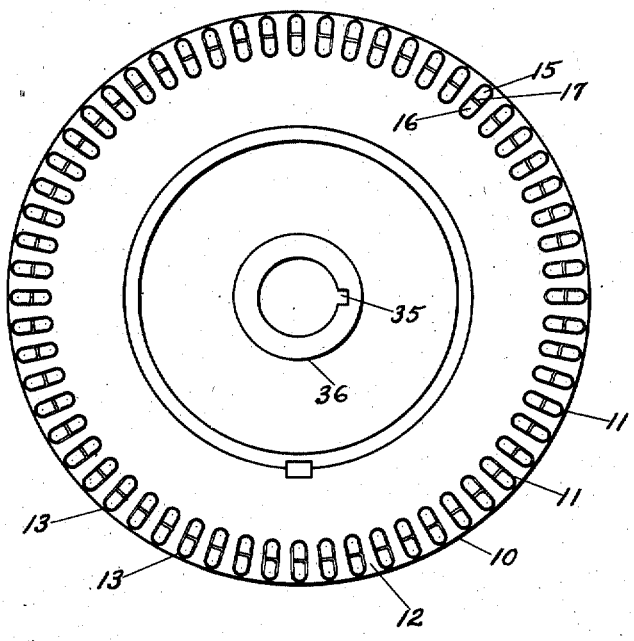
Fig. 1 is an end view of a core showing winding apertures with insulating linings placed therein.
Figure 3:
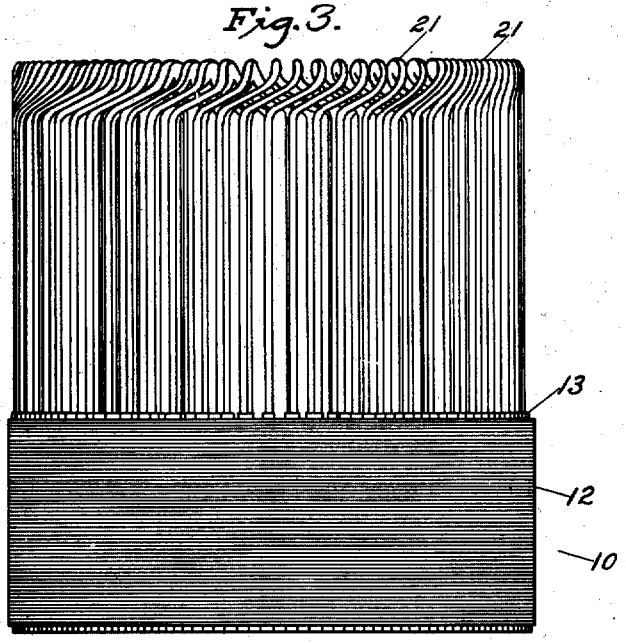
Fig. 3 shows a core with a plurality of loops assembled ready for endwise entry thru the winding apertures of the core.

In putting my invention into practice I provide a core 10 which preferably has closed winding apertures 11 as shown in Fig. 1 tho semiclosed or open slots may be used instead. The core is preferably composed of laminæ 12 as shown in Fig. 3. A lining 13 of insulating material is placed in each aperture.

Figure 2:
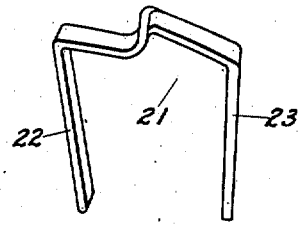
Fig. 2 shows the form of conductor loop usually used in carrying out the present invention.

After a core has been provided and the apertures lined as shown in Fig. 1, I provide a plurality of winding loops of the character shown at 21, Fig. 2, the required number corresponding to the number of apertures 11 in core 10. These loops are stacked in cylindrical formation, preferably by the method described in my copending reissue application Serial No. 205,259, division A, now Reissue Patent No. 17,353, July 2, 1929 until, in the aggregate, they take the form shown in Fig. 3 where all conductor bars 22 of loops 21, Fig. 2, are slightly entered into the pockets 15 of the linings and all conductor bars 23 of loops 21 Fig. 2, are slightly entered into pockets 16 of the linings. In this form the loops 21 are ready for simultaneous endwise entry into the winding apertures of the core.

Figure 4:
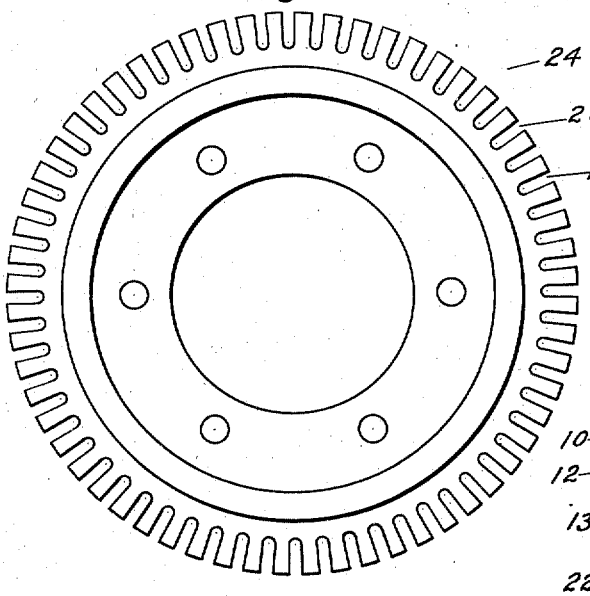
Fig. 4 is a plan view of a slotted supporting member upon which the core is placed when the conductor loops are pressed thru the core.

Since linings 13 are not at this stage cemented or otherwise held in the apertures 11 they would ordinarily be pushed from the apertures when the bars are pressed in, and to overcome this tendency I provide means to retain the linings in the apertures while the bars are being pressed into position. A supporting member 24 Fig. 4 has radial slots 26 corresponding in number to the core apertures 11 but fitting the conductor bars snugly.

Figure 5:
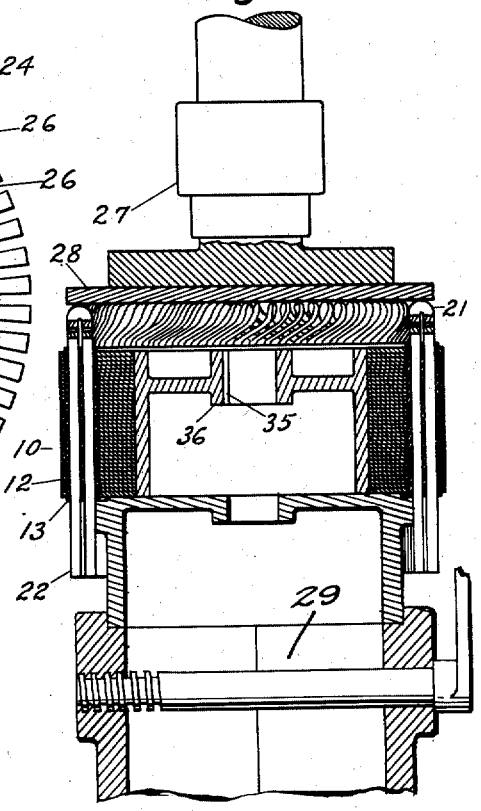
Fig. 5 is a cross section thru a core resting on the supporting member with the conductor loops pressed thru the core and into the slots of the supporting member.

The structure shown in Fig. 3 is placed on supporting member 24 with the core apertures 11 in register with the slots 26 of the supporting member, then a pressing member 27 carrying a plate 28 adapted to engage the ends of the loops 21 is brought down and the loops are pressed into place as shown. (See Fig. 5.) The snug fitting slots 26 admit the bars 22 and 23 but do not admit linings 13. The linings are therefore retained in the core apertures 11 while the conductors are pressed into place.

Figure 6:
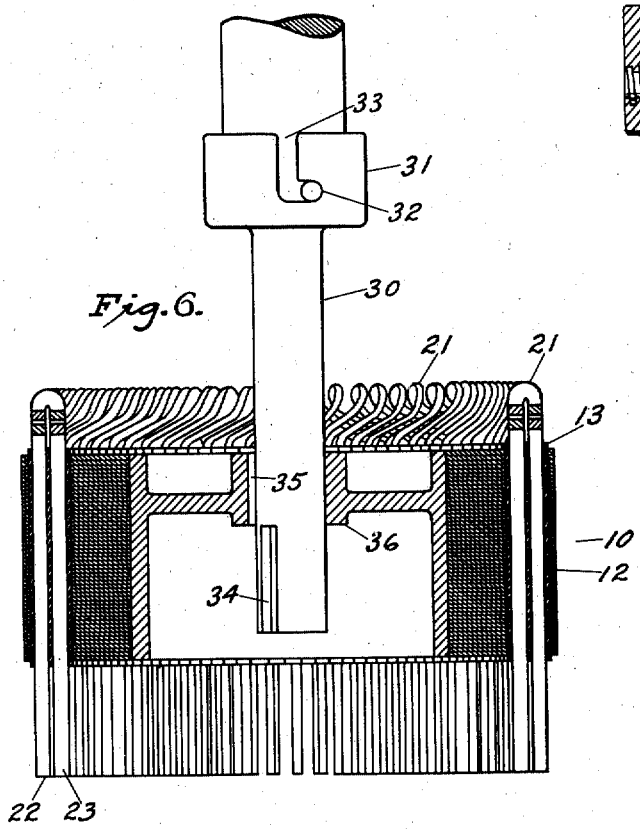
Fig. 6 is a cross section thru a core and the tool used to withdraw the conductor ends from the slots of the supporting member.

Since slots 26 of supporting member 24 fit bars 22 and 23 snugly there is some difficulty in removing the structure from the member and the means provided for withdrawing the structure is shown in Fig. 6. Supporting member 24 is held secured to the press by clamp 29. Plate 28 is removed from pressing member 27 and a mandrel 30 having a hollow head 31 is fitted to the pressing member 27 by means of pin 32 entering slot 33. The lower end of the mandrel is provided with a fixed key or projection 34 adapted to enter thru keyway 35 of the core hub 36. The mandrel is pressed thru the bore of hub 36 and rotated until the key 34 is out of alignment with keyway 35, whereupon pressing member 27 is raised, and the core and winding therewith, while slotted supporting member 24 remains attached to the press. When mandrel 30 is removed from the core the operation which forms the subject of this invention is completed.

Having described my invention, I claim:—

Steps in the method of making an armature, which consist of providing a core having a plurality of winding apertures, lining said apertures with sheet insulation, entering a plurality of winding bars slightly into one end of the linings, placing the structure on a plate having apertures corresponding to the core apertures but slightly smaller so as to fit the bars snugly, pressing the bars thru the linings and into the plate, then withdrawing the bars from the plate.

VINCENT G. APPLE.